UNITED STATES PATENT OFFICE.

TUNEICHI FUJIYAMA, OF TOKYO, JAPAN.

PROCESS OF MANUFACTURING NITROGEN COMPOUNDS FROM CARBIDS.

1,126,000. Specification of Letters Patent. Patented Jan. 26, 1915.

No Drawing. Application filed February 25, 1914. Serial No. 821,080.

*To all whom it may concern:*

Be it known that I, TUNEICHI FUJIYAMA, a subject of the Emperor of Japan, residing at No. 116 Rokuchome, Aoyama-Minami-machi, Akasaka-ku, Tokyo, Japan, have invented certain new and useful Improvements in Processes of Manufacturing Nitrogen Compounds from Carbids, of which the following is a specification.

My invention consists of a process of manufacturing nitrogen compounds from pulverized carbids without the use of electric or any other outside heat, but by their heat of chemical combination only.

The object of my invention is to manufacture in this way nitrogen compounds of excellent quality at very low cost.

According to my invention a suitable nitrogen chamber lined with a refractory non-conducting material is constructed. A small quantity of pulverized carbids is first put in said nitrogen chamber. In order to start the process, the carbids are ignited and air is introduced, the pulverized carbids burning vigorously in the air and heat is thus generated. As soon as a suitable degree of temperature is reached, nitrogen gas is introduced instead of air and the operation now goes on only with the heat produced by the chemical combination. When more carbids are added, these are heated by the heat of chemical combination and they absorb nitrogen. Chemical reaction being started in this way, the contents of the nitrogen chamber are heated more and more by their heat of chemical combination, and chemical reaction goes on vigorously. If, as chemical reaction goes on, more carbids are put in the nitrogen chamber either continuously or intermittently in such a way as to keep the contents of the nitrogen chamber covered with a layer of carbids of a certain thickness, chemical reaction can easily be continued by the heat of chemical combination only, and no supply of heat from other sources is required. As a general rule, chemical reaction takes place most vigorously where temperature is the highest. Since, in my process the surface of the compounds in the nitrogen chamber, which is kept covered with a layer of carbids as chemical reaction goes on, radiates the least possible amount of heat, chemical reaction can be continued in the nitrogen chamber without any supply of heat from outside sources. As only a small amount of heat is radiated through the layer of carbids, the temperature in the nitrogen chamber will always be far below the reaction temperature.

In manufacturing nitrogen compounds from carbids, chemical reaction becomes more vigorous as the temperature becomes higher. When, however, a certain degree of temperature which becomes higher as the pressure is increased, is reached, not only is chemical reaction retarded but the finished products are apt to be decomposed. In order to make carbids completely absorb nitrogen according to their quality, the most important factor is to regulate the temperature so that it will approach as near as possible the decomposition temperature without, however, reaching it. The amount of heat of chemical combination differs according to the quality of carbids; the better the quality of the carbids, the greater is the amount of heat generated by the chemical combination. Hence the danger of reaching the decomposition temperature, if carbids of good quality are used. It is, therefore, essential to the results of this process that the temperature in the nitrogen chamber should be suitably lowered by means of air, water or any other adequate cooling means in order to take away a part of the heat of chemical combination and prevent the compounds from reaching the decomposition temperature.

All the known processes of manufacturing nitrogen compounds from carbids, which are publicly known, depend on electric or other outside heat. In carrying out these processes, it is impossible to constantly maintain an even degree of heat throughout the entire mass, which often results in overheating or under-heating. Some finished products may, therefore, be decomposed, while some products are apt to remain in an incomplete stage of manufacture, which results in a difficulty of eliminating products of uneven qualities. In my process, chemical reaction depends entirely on its own heat of chemical combination, it being unnecessary to depend on heat supplied from an outside source. It is, therefore, clear that by my new process, excellent products of even quality can be obtained. It is needless to point out that by the elimination of outside heat is reduced the cost of products by the device that renders unnecessary any supply of heat from other sources.

My process can be carried on continuously with a suitable arrangement for removing finished products from the nitrogen chamber. Or else it can be carried on intermittently, that is to say, the process is continued until the nitrogen chamber is full of finished products and then the process is started anew in another nitrogen chamber.

Any ordinary carbids such as sold on the market can be used for my process.

Having thus described my invention, what I claim as new and desire to secure by Letters Patent is:—

1. The process of making nitrogen compounds from carbids which consist in burning pulverized carbids in a closed chamber, then introducing nitrogen gas causing it to chemically combine with the burning carbids, and thereupon adding more carbids so as to keep the compound covered with a layer of carbids, substantially as described.

2. The process of making nitrogen compounds from carbids which consist in burning pulverized carbids in a closed chamber, then introducing nitrogen gas causing it to chemically combine with the burning carbids, adding more carbids so as to keep the compound covered with a layer of carbids and cooling said chamber to prevent decomposition, substantially as described.

In testimony whereof I affix my signature in presence of two witnesses.

TUNEICHI FUJIYAMA.

Witnesses:
M. MOEHIJUHI,
H. F. HAWLEY.

Copies of this patent may be obtained for five cents each, by addressing the "Commissioner of Patents, Washington, D. C."